United States Patent [19]
Yanagawa et al.

[11] Patent Number: 5,734,451
[45] Date of Patent: Mar. 31, 1998

[54] ACTIVE MATRIX TYPE LIQUID CRYSTAL DISPLAY DEVICE WITH SPECIFIC CONFIGURATIONS OF THE REFERENCE ELECTRODE AND/OR THE VIDEO SIGNAL LINE

[75] Inventors: Kazuhiko Yanagawa; Masuyuki Ohta; Kazuhiro Ogawa; Keiichiro Ashizawa; Minoru Hoshino, all of Mobara, Japan

[73] Assignee: Hitachi, Ltd., Tokyo, Japan

[21] Appl. No.: 753,957

[22] Filed: Dec. 3, 1996

[30] Foreign Application Priority Data

Dec. 4, 1995 [JP] Japan .................. 7-314966

[51] Int. Cl.$^6$ .................. G02F 1/136; G02F 1/1343
[52] U.S. Cl. .................. 349/43; 349/141
[58] Field of Search .................. 349/42, 141, 43

[56] References Cited

U.S. PATENT DOCUMENTS

| | | | |
|---|---|---|---|
| 4,345,249 | 8/1982 | Togashi | 349/141 |
| 5,598,285 | 1/1997 | Kondo et al. | 349/141 |
| 5,600,464 | 2/1997 | Ohe et al. | 349/138 |

FOREIGN PATENT DOCUMENTS

| | | | |
|---|---|---|---|
| A2-588568 | 3/1994 | European Pat. Off. | |
| B-63-21907 | 5/1988 | Japan | |
| 1-136120 | 5/1989 | Japan | 349/141 |
| 1-229296 | 9/1989 | Japan | 349/141 |
| A-6-202127 | 7/1994 | Japan | |
| WO 91/10936 | 7/1991 | WIPO | |

OTHER PUBLICATIONS

'95 Asia Display S30-2,"Development of Super-TFT-LCDs with In-Plane Switching Display Mode", pp.707-710, by Ohta et al.

Primary Examiner—William L. Sikes
Assistant Examiner—Walter Malinowski
Attorney, Agent, or Firm—Antonelli, Terry, Stout, & Kraus, LLP

[57] ABSTRACT

A display panel structure for suppressing vertical smear is provided for an active matrix type liquid crystal display device employing in-plane switching. Each of pixel regions arranged in a matrix form and constituting a display panel takes the form of a rectangle having a side along an adjacent video signal line shorter than a side along a scan signal line. A display electrode and reference electrodes arranged in each pixel region respectively have a strip-like shape extending in a direction orthogonal to a video signal line.

9 Claims, 11 Drawing Sheets

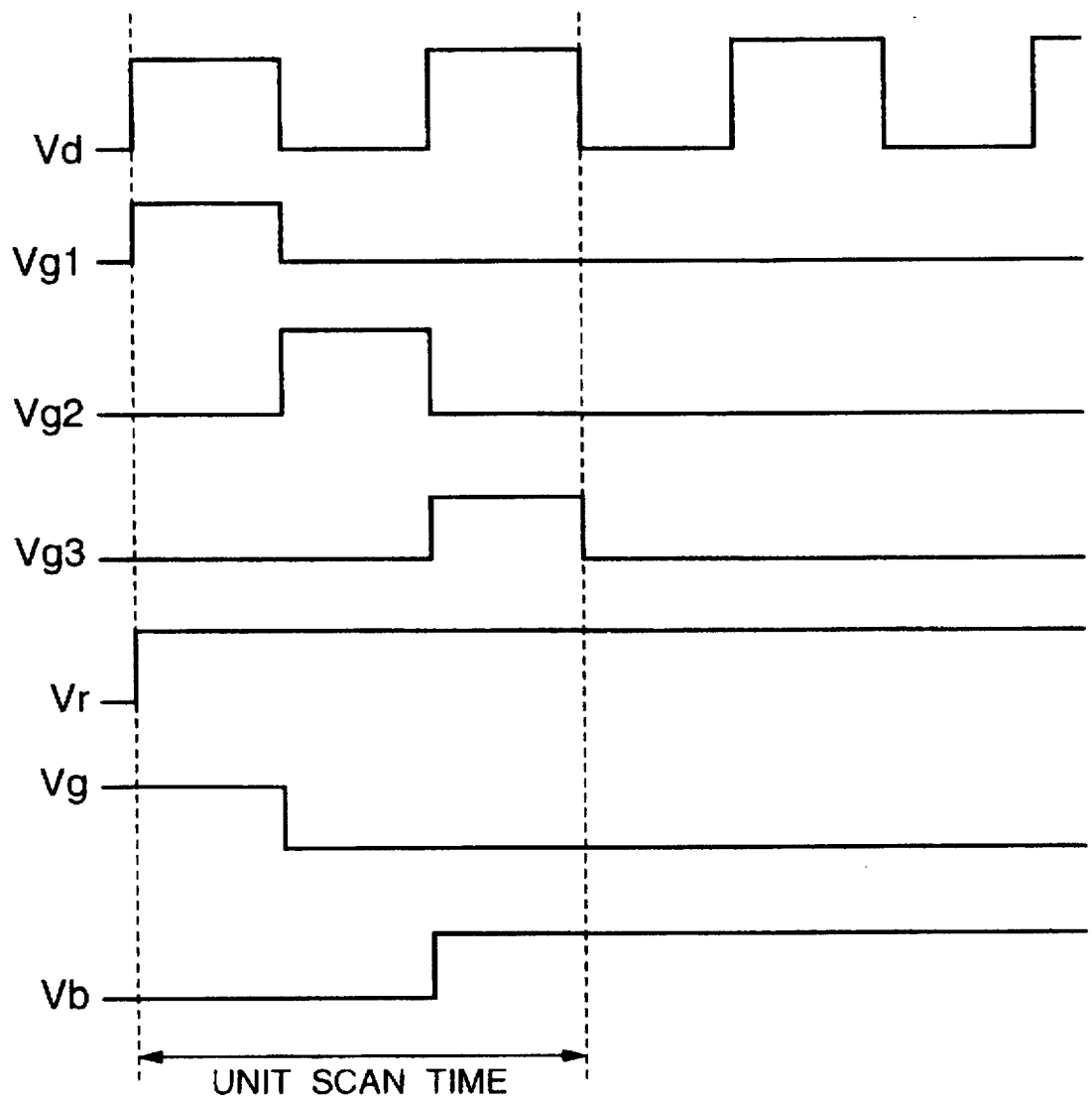

ACTIVE MATRIX TYPE LIQUID CRYSTAL DISPLAY DEVICE WITH SPECIFIC CONFIGURATIONS OF THE REFERENCE ELECTRODE AND/OR THE VIDEO SIGNAL LINE

BACKGROUND OF THE INVENTION

The present invention relates generally to an active matrix type liquid crystal display device, and more particularly to an active matrix type liquid display device which employs an in-plane switching method.

An active matrix type liquid crystal display device employing the so-called in-plane switching method comprises a display electrode and reference electrodes arranged in a surface region corresponding to a unit pixel of a liquid crystal on one or both of two transparent substrates which are arranged opposite to each other through the liquid crystal. This structure is designed such that an electric field is generated between the display electrode and the reference electrodes in parallel with the surfaces of the transparent substrates to modulate light transmitting the liquid crystal.

Such a liquid crystal display device allows the viewer to recognize a clear image displayed thereon, even if the viewer observes the image at a large visual field angle with respect to the display screen. Therefore, the liquid crystal display device has been well known to provide clear images over a wide range of visual field.

For reference, liquid crystal display panels having the configuration as mentioned above are described in detail in documents including, for example, PCT WO91/10936 published Jul. 25, 1991 (JP-Kohyo 5-505247), JP-B-63-21907, EP-A2-0588,568 (JP-A-61-60878), and so on.

All of the liquid crystal display panels described in the above documents employ a so-called vertical stripe structure, known in the art, in which each pixel region has a side along a video signal line longer than a side along a scan signal line. It has been reported, however, that the active matrix type liquid crystal employing the in-plane switching method, constructed as mentioned above, is more likely to suffer from vertical smear when an image is displayed thereon.

Specifically, the vertical smear is caused by an electric field generated by a video signal from a video signal line between a display electrode and reference electrodes, positioned adjacent to the video signal line, i.e., by an electric field other than an electric field generated between the display electrode and the reference electrodes essentially contributing only to display. The vertical smear is a cause of preventing improvement in the quality of displayed images.

The co-inventors of the present invention have found that vertical smear exists in the in-plane switching structure, and have proposed in U.S. patent application Ser. No. 08/374,531 (corresponding to A-06-202127) to employ thin film transistors (TFT) having a stagger structure to provide an electric field shield for preventing the vertical smear. The disclosure of the patent application has also proposed another aspect in which a shield electrode is arranged adjacent to a drain line using inverted stagger TFTs. The disclosure of U.S. patent application Ser. No. 08/374,531 is incorporated herein by reference. The present inventors have further published the fact that a liquid crystal display device of a vertical display electrode type has a problem of smear in Asia Display '95, S30-2, "Development of Super-TFT-LCDs with In-Plane Switching Display Mode", pp 707–710, Oct. 16, 1995.

SUMMARY OF THE INVENTION

It is an object of the present invention to provide an active matrix type liquid crystal display device which is capable of suppressing the occurrence of so-called vertical smear.

In addition to the above object, it is another object of the present invention to provide an active matrix type liquid crystal display device which has such a structure that increases an area of a pixel region and improves an aperture ratio resulting from an increased area of the pixel region.

From a number of aspects of inventions disclosed in the present application, representative ones will be outlined as follows.

In a first aspect of the present invention, an active matrix type liquid crystal display device comprises transparent substrates arranged opposite to each other through a liquid crystal layer, a display electrode and reference electrodes arranged on one of the transparent substrates in a region corresponding to a unit pixel in the liquid crystal layer, and a plurality of video signal lines and scan signal lines formed in a matrix having a first side and a second side orthogonal to each other, wherein the display electrode is supplied with a video signal from a video signal line common to the unit pixels arranged in the direction of the second side of the matrix through a switching element which is turned on by a scan signal supplied thereto from a scan signal line common to unit pixels arranged in the direction of the first side of the matrix, and a light transmittance of the liquid crystal layer is varied by an electric field generated in parallel with the surfaces of the transparent substrates between the display electrode and the reference electrodes which are applied with a constant voltage through a reference signal line common to the unit pixels arranged in the direction of the first side of the matrix. In this structure, each of the pixel regions is formed such that a side along the adjacent video signal line is shorter than a side along the scan signal line.

In a second aspect of the present invention, an active matrix type liquid crystal display device comprises transparent substrates arranged opposite to each other through a liquid crystal layer, a display electrode and reference electrodes arranged on one of the transparent substrates in a region corresponding to a unit pixel in the liquid crystal layer, and a plurality of video signal lines and scan signal lines formed in a matrix having a first side and a second side orthogonal to each other, wherein the display electrode is supplied with a video signal from a video signal line common to the unit pixels arranged in the direction of the second side of the matrix through a switching element which is turned on by a scan signal supplied thereto from a scan signal line common to unit pixels arranged in the direction of the first side of the matrix, and a light transmittance of the liquid crystal layer is varied by an electric field generated in parallel with the surfaces of the transparent substrates between the display electrode and the reference electrodes which are applied with a constant voltage through a reference signal line common to the unit pixels arranged in the direction of the first side of the matrix. In this structure, the display electrode and the reference electrodes respectively have a strip-like shape extending in a direction orthogonal to the video signal line.

The active matrix type liquid crystal display configured according to the first aspect has a structure in which each pixel region has the side along the adjacent video signal line shorter than the side along the scan signal line. In other words, each pixel region has a lateral stripe structure instead of a conventional vertical stripe structure.

With the lateral stripe structure, a range of each laterally extending pixel regions into which an electric field from the video signal line possibly enters is limited to both side portions of the pixel region which are extremely reduced portions compared with the entire pixel region. It is therefore possible to suppress the occurrence of vertical smear.

In the active matrix type liquid crystal display device configured according to the second aspect, since the display electrode and the reference electrodes are respectively formed in a strip-like shape extending in the direction orthogonal to the video signal line in each pixel region, an electric field from the video signal line entering into the pixel region, when the video signal line terminates to the display electrode or the reference electrodes, is in a direction perpendicular to an electric field between the display electrode and the reference electrodes, which is associated with actual display, so that the entering electric field will not adversely affect the actual display, thus making it possible to suppress %he occurrence of vertical smear.

Other objects, features and advantages of the invention will become apparent when reading the following detailed description taken in conjunction with the accompanying drawings.

BRIEF DESCRIPTION OF THE DRAWINGS

FIG. 7 is a timing diagram illustrating an embodiment of a liquid crystal display device driving method according no the present invention;

DESCRIPTION OF THE PREFERRED EMBODIMENTS

An active matrix type display device according to the present invention will hereinafter be described in connection with some embodiments thereof with reference to the accompanying drawings.

Embodiment 1

Figure 9:
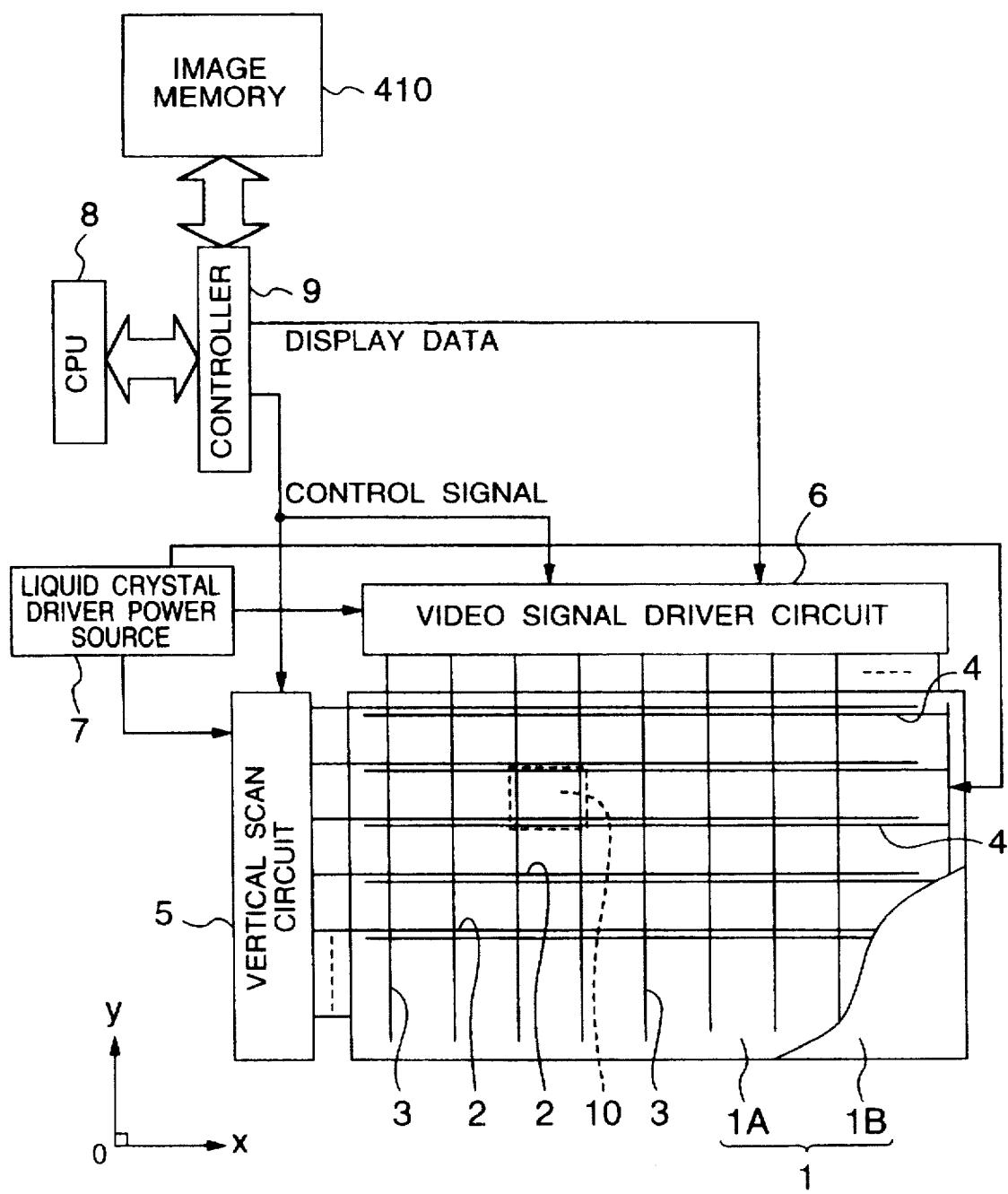
FIG. 9 is a block diagram generally illustrating an embodiment of the liquid crystal display device according to the present invention and peripheral circuits associated therewith.

FIG. 9 generally illustrates a liquid crystal display device employing an in-phase switching method and peripheral circuits associated therewith.

Referring specifically to FIG. 9, a liquid crystal display device 1 includes a transparent substrate 1A and a transparent substrate 1B, as an envelope for the liquid crystal display device 1, and a liquid crystal layer is arranged therebetween. On the surface of the transparent substrate 1A, serving as a so-called lower substrate, facing the liquid crystal layer, scan signal lines 2 and reference signal lines 4 are formed extending along an x-direction and in parallel with each other along a y-direction in the figure. The scan signal lines 2 and the reference signal lines 4 are alternately arranged in such a manner that the uppermost scan signal line 2 is closely spaced from an associated reference signal line 4 in the -y-direction, followed by the second scan signal line 2 largely spaced from this reference signal line 4 in the -y-direction, followed by the second reference signal line 4 closely spaced from the second scan signal line 2 in the -y-direction, and so on. Further, video signal lines 3, insulated from the scan signal lines 2 and the reference signal lines 4, are formed extending along the y-direction and in parallel with each other in the x-direction. Thus, the signal lines 2, 3, 4 form a matrix on the surface of the transparent substrate 1A.

Respective rectangular regions 10 surrounded by the scan signal lines 2, the reference signal lines 4 and the video signal lines 3 constitute pixel regions which are arranged in a matrix form to provide a display screen area. A display electrode is formed in each of the pixel regions, and a thin film transistor TFT and a capacitor Cstg are arranged in a peripheral portion of the pixel region. Although these components are not illustrated in FIG. 9, they will be described later in detail.

The liquid crystal display device 1 is also provided with a vertical scan circuit 5 and a video signal driver circuit 6 as i%s external circuits. The vertical scan circuit 5 sequentially supplies a scan signal (voltage) to each of the scan signal lines 2 such that the video signal driver circuit 6 supplies the video signal lines 3 with a video signal (voltage) at timing synchronized with the scan signal supplied by the vertical scan circuit 5.

It should be noted that the vertical scan circuit 5 and the video signal driver circuit 6 are powered by a liquid crystal driver power source 7, and are supplied with display data and control signals which are separated from image information sent from a CPU 8 by a controller 9. In the present embodiment, the display data is supplied to the circuits 5, 6 through an image memory 410, the functions of which will be described later in detail.

A voltage applied to the reference signal lines 4 is also supplied from the liquid crystal driver power source 7. In the present embodiment, the voltage applied to the reference signal lines 4 is an AC voltage for the purpose of reducing the breakdown voltage of the video signal driver circuit 6. However, a DC current may be used if the breakdown voltage need not be taken into consideration.

Figure 1:
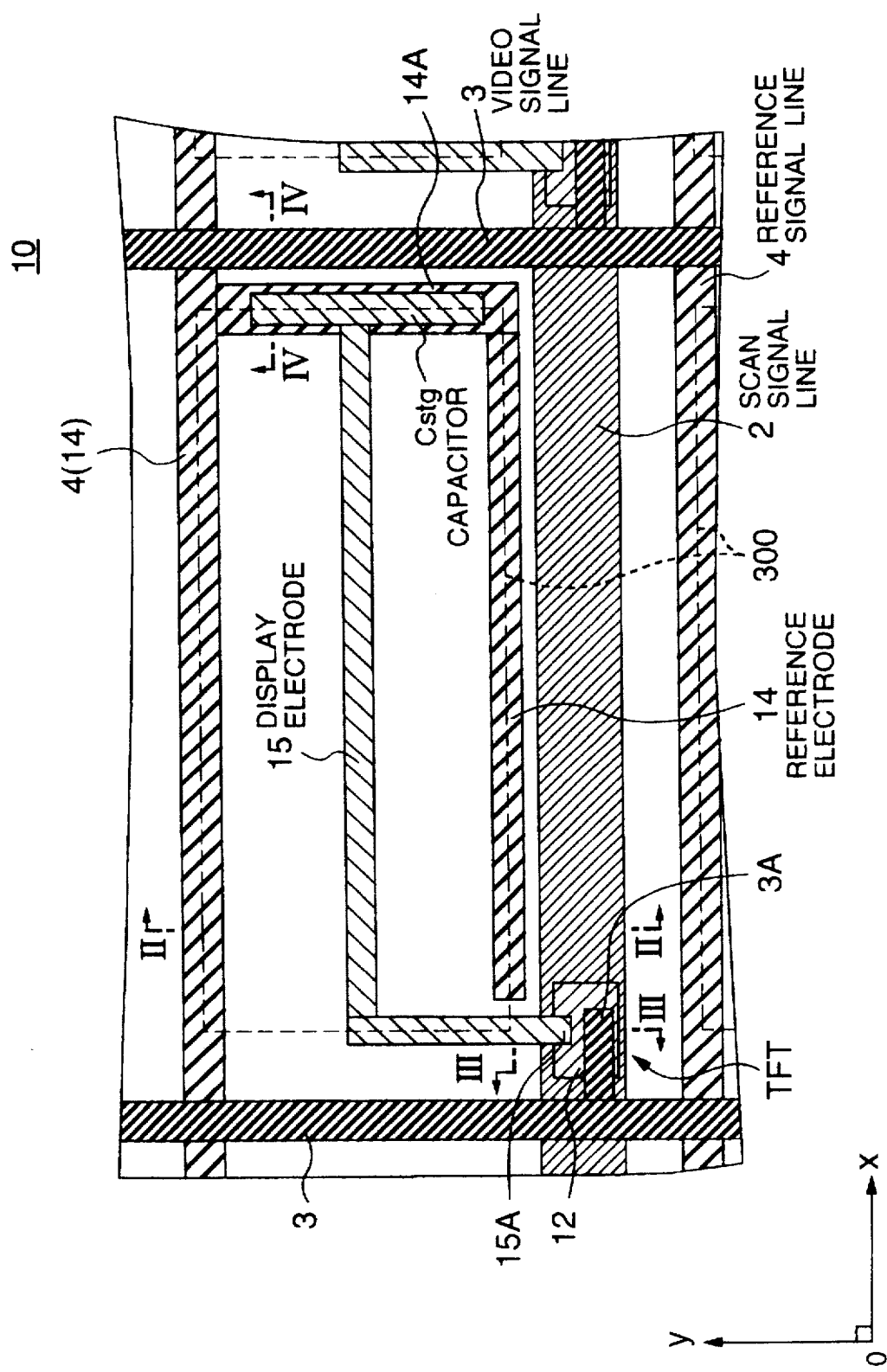
FIG. 1 is a plan view of a pixel region illustrating an embodiment of a liquid crystal display device according to the present invention.
Figure 2:
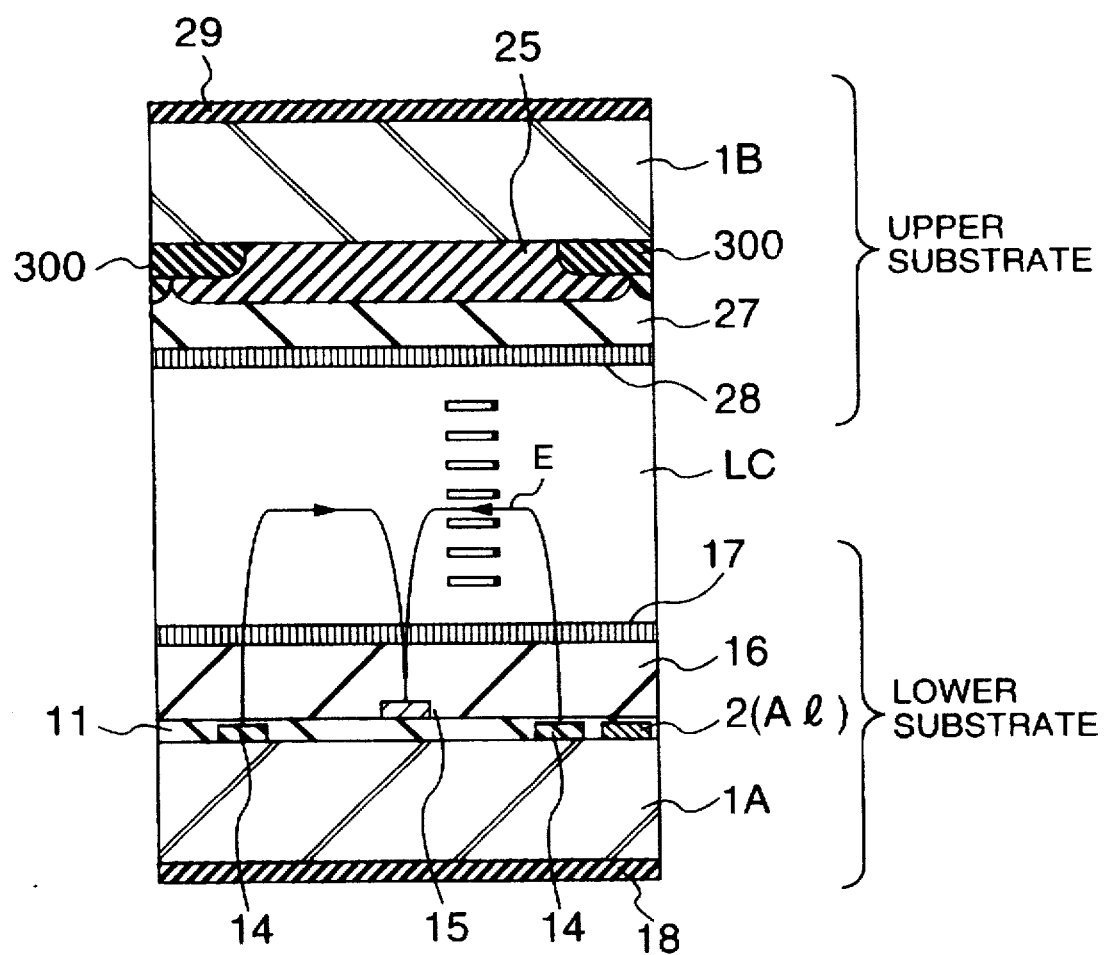
FIG. 2 is a cross-sectional view taken along a line II—II in FIG. 1.

FIG. 1 is a plan view illustrating in detail the structure of one pixel region in the liquid crystal display device 1, specifically, a unit pixel region 10 corresponding to the region defined by a broken line in FIG. 9. Also, a cross-sectional view taken along a line II—II in FIG. 1 is illustrated in FIG. 2; a cross-sectional view along a line III—III in FIG. 3; and a cross-sectional view along a line IV—IV in FIG. 4, respectively.

On the surface of the transparent substrate 1A adjacent to the liquid crystal layer, a scan signal line 2 made of, for example, aluminum (Al) is formed extending along the x-direction. In addition, a reference signal line 4 is formed extending along the x-direction, close to the scan signal line 2 on the +y-direction side thereof. The reference signal line 4 is also made of, for example, Al. A region surrounded by the scan signal line 2, the reference signal lines 4, and video signal lines 3, later described, constitutes a pixel region, as previously described. It should be particularly noted that in the present embodiment, the pixel region is formed such that its side along the adjacent video signal line 3 is shorter than its side along the scan line signal 2, thus defining a so-called lateral stripe structure.

In addition, the pixel region 10 includes a reference electrode 14 formed by the reference signal line 4, and another reference electrode 14 formed adjacent to the scan signal line 2. The pair of horizontally extending reference electrodes 14 are positioned adjacent to one of a pair of video signal lines 3 (on the right side of the figure), later described, and are electrically connected to each other through a conductive layer 14A which is formed simultaneously with the reference electrodes 14.

In the structure described above, the reference electrodes 14 forming a pair extend in the direction parallel with the scan signal line 2. Stated another way, the reference electrodes take the form of a strip extending in a direction perpendicular to the video signal lines 3, later described.

On the surface of the transparent substrate 1A on which the scan signal lines and so on are formed, an insulating film 11 (see FIGS. 2, 3, 4) made of, for example, silicon nitride is formed overlying the scan signal line 2, the reference signal lines 4, and even the reference electrodes 14. This insulating film 11 functions as an inter-layer insulating film for insulating the scan signal line 2 and the reference signal lines 4 from the video signal lines 3, later described, as a gate oxide film for a region in which a thin film transistor TFT is formed, and as a dielectric film for a region in which a capacitor Cstg is formed.

Figure 3:
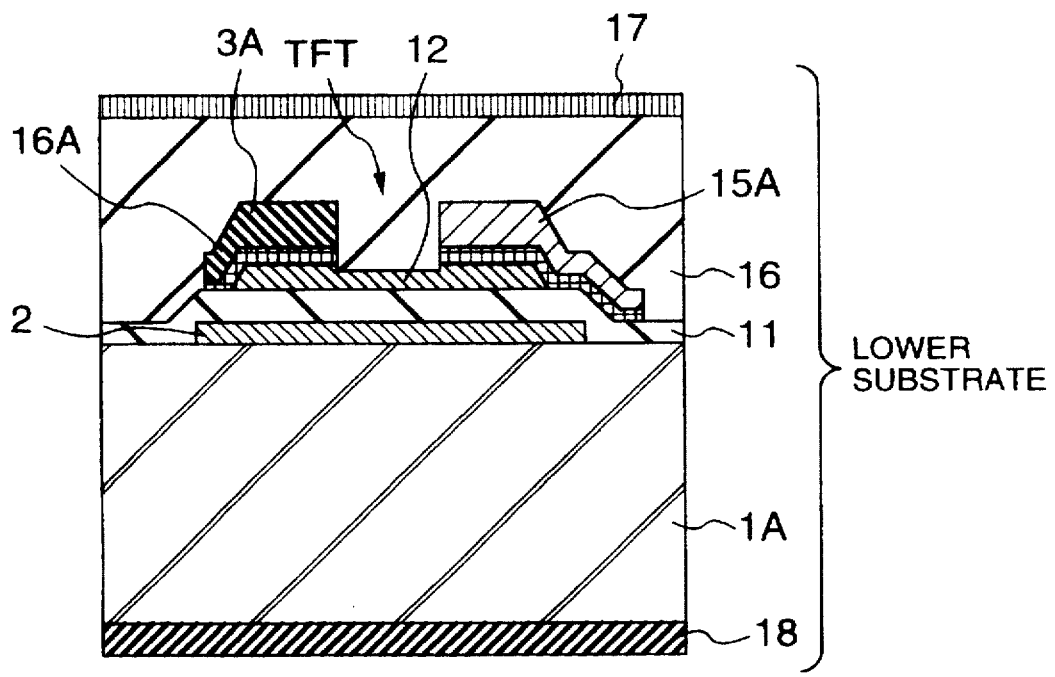
FIG. 3 is a cross-sectional view taken along a line III—III in FIG. 1.

Referring next to FIG. 3, on the surface of the insulating film 11, a semiconductor layer 12 is formed in the region in which a thin film transistor TFT is formed. The semiconductor layer 12, made of, for example, amorphous silicon (Si), is formed overlying the scan signal line 2 in an overlapping relationship with the video signal line 3, i.e., the video signal line 3A on the left in the figure. With this structure, a portion of the scan signal line 2 serves also as a gate electrode of the thin film transistor TFT.

Figure 4:
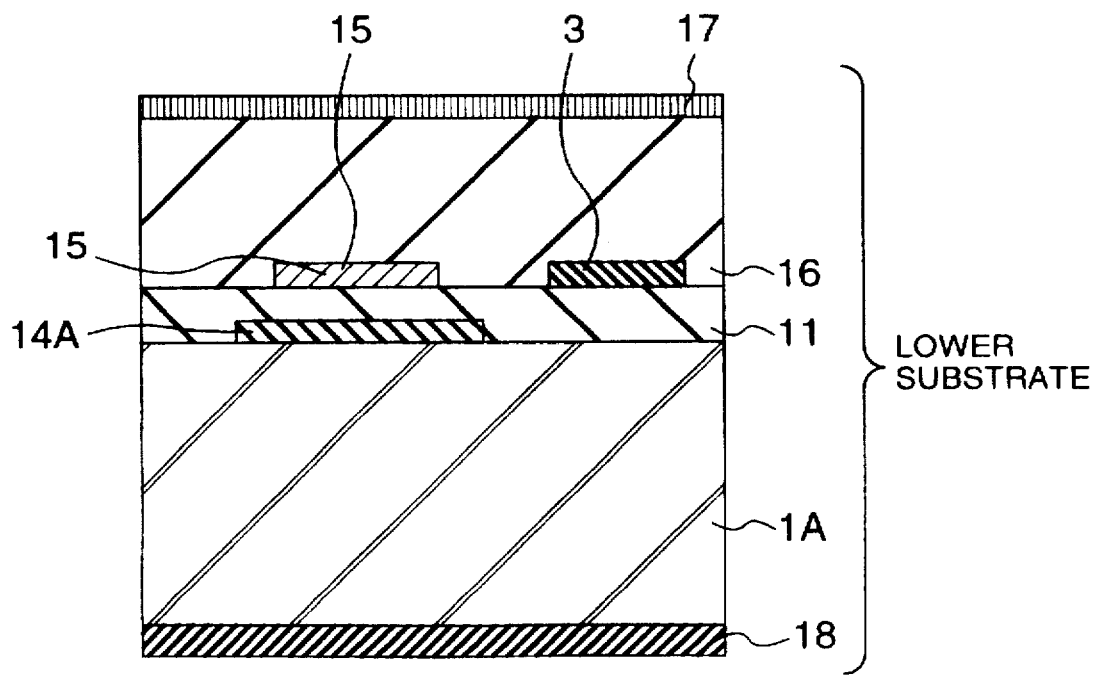
FIG. 4 is a cross-sectional view taken along a line IV—IV in FIG. 1.

Referring further to FIGS. 3, 4, on the surface of the insulating film 11, the video signal line 3, extending in the y-direction, is formed of a layered structure having sequentially laminated Cr and Al layers. A portion of the video signal line 3 is extended to integrally form a drain electrode 3A on a portion of the surface of the semiconductor film 12.

In a unit pixel region 10, a display electrode 15 is formed on the surface of the insulating film 11. The display electrode 15 is formed to divide the pixel region 10 into two. More specifically explaining with reference to FIG. 2, one end of the display electrode 15 is formed integrally with a source electrode 15A of the thin film transistor TFT, extended in the +y-direction, and then extended in the +x-direction in the figure. With this structure, the display electrode 15 extends in the direction parallel with the scan signal line 2, in other words, takes the form of a strip extending in a direction perpendicular to the video signal line 3.

In the foregoing structure, the leading end of the display electrode 15 includes a T-shaped portion extending along a conductive layer 14A for connecting the respective reference electrodes 14 to each other. This T-shaped portion constitutes a capacitor Cstg together with the insulating film 11 as a dielectric film. The capacitor Cstg has an advantage of storing video information on the display electrode 15 for a longer time period, for example, when the thin film transistor TFT is turned off.

As can be best seen in FIG. 3, phosphor (P) is heavily doped into an interface between the drain electrode 3A and the source electrode 15A of the thin film transistor TFT and the semiconductor layer 12 to form a heavily doped layer which provides ohmic contacts for the respective electrodes in this case, after the heavily doped layer is formed over the entire surface of the semiconductor layer 12, the respective electrodes are formed. Then, these electrodes are used as masks to etch out the heavily doped layer except for the electrode forming regions, thereby realizing the aforementioned structure.

Subsequently, a protective film 16 (see FIGS. 2, 3, 4) made of, for example, silicon nitride is formed on the upper surface of the insulating film 11, on which the thin film transistor TFT, the video signal lines 3, and the capacitor Cstg have been formed, overlying the thin film transistor TFT and so on. Further on the upper surface of the protective film 16, an alignment film 17 is formed to constitute a so-called lower substrate of the liquid crystal display device 1. In addition, a polarizing plate 18 is arranged on the surface of the lower substrate opposite to the surface adjacent to the liquid crystal layer.

In the transparent substrate 1B serving as the so-called upper substrate, a light shield film 300 is formed on the surface adjacent to the liquid crystal, in such a manner that most of a central portion of the pixel region is left open except for a peripheral portion, as indicated by a broken line in FIG. 1. The light shield film 300 is provided for protecting the thin film transistor TFT from being irradiated with external light to thereby prevent deteriorations in the characteristics of the thin film transistor TFT, as well as for improving the contrast of images displayed on the liquid crystal display device. The light shield film 300 is made of, for example, organic resin or the like having black pigment dispersed therein.

FIG. 2 illustrates in a cross-sectional view the transparent substrate 1B on which the light shield film 300 is formed. In the opening of the light shield film 300, a color filter 25 is formed to close the opening. Then, a planar film 27 is formed to cover the color film 25 and the light shield film 300, and an alignment film 28 is formed on the surface of the planar film 27 facing the liquid crystal layer.

Figure 5:
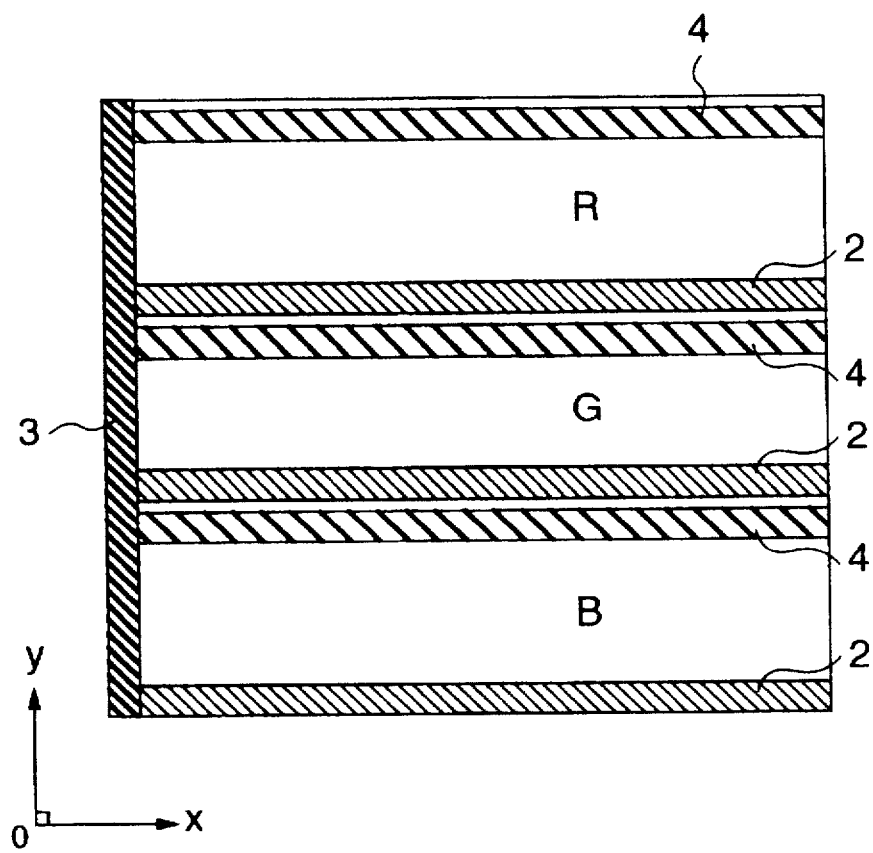
FIG. 5 is a diagram illustrating a lay-out of a color filter in an embodiment of the liquid crystal display device according to the present invention.

The color filter 25 is formed to define three pixel regions adjacent to and extending along the video signal line 3 and to position a red (R) filter, a green (G) filter, and a blue (B) filter, for example, from the top of the three pixel regions, as illustrated in FIG. 5. The three pixel regions constitute one pixel region for color display.

A polarizing plate 29 is also arranged on the surface of the upper substrate 1B opposite to the surface adjacent to the liquid crystal layer on which various films are formed as described above.

It will be understood that in FIG. 2, a voltage applied between the reference electrodes 14 and the display electrode 15 causes an electric field E to be generated in the liquid crystal layer LC in parallel with the respective surfaces of the transparent substrates 1A, 1B. This is because the illustrated structure is referred to as the in-plane switching as mentioned above.

Figure 6:
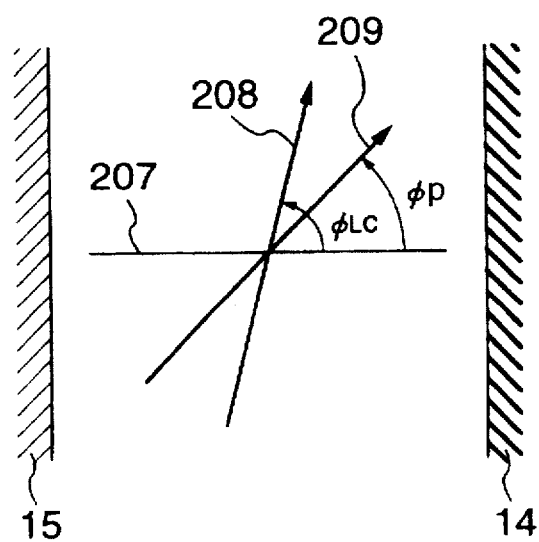
FIG. 6 is an explanatory diagram for illustrating the relationship between alignment layers and polarizing plates used in the liquid crystal display panel according to the present invention.

Next, the relationship between the alignment film 17 and the polarizing plate 18 formed on the respective surfaces of the transparent substrate 1A and the alignment film 28 and the polarizing plate 29 formed on the respective surfaces of the transparent substrate 1B will be explained with reference to FIG. 6.

An angle φLC formed by a rubbing direction 208 of the alignment film 17 or 28 with a direction 207 of an electric field applied between the display electrode 15 and the reference electrode 14 is 75°. In addition, an angle φP formed by a polarized light transmitting axis direction 209 of the polarizing plate 18 with the direction 207 of the electric field is equal to the angle φLC. The polarized light transmitting axis direction of the other polarizing plate 29 is orthogonal to the direction 209. The liquid crystal layer LC includes a nematic liquid crystal exhibiting a positive dielectric constant anisotropy $\Delta\epsilon$ having a value of 7.3 (for 1 kHz), and a refractive index anisotropy $\Delta n$ having a value of 0.073 (for 589 nm at 20° C.).

With the structure as described above, an electric field may be generated in the liquid crystal layer LC in parallel with the transparent substrate 1A to modulate light transmitting the liquid crystal layer LC. Particularly, the modulation of light transmitting the liquid crystal layer can provide the liquid crystal display device with a so-called normally black mode in which black is displayed when no electric field is applied and white is displayed when the electric field is applied.

It should be noted that the foregoing structure differs from the prior art in that three pixels constituting one color display pixel are assigned to three adjacent pixels located along the direction in which the video signal line 3 extends. In the prior art, display data from the controller 9 illustrated in FIG. 9 is transmitted such that respective pixel signals R, G, B are parallelly sent through their corresponding video signal lines 3 adjacent to each other, for example, at a frequency corresponding to 60 Hz.

Thus, in the present embodiment, an image memory 410 is characteristically provided as illustrated in FIG. 9, such that the pixel signals R, G, B from the CPU 8 are once stored in the image memory 410, and controlled by the controller 9 to be sequentially supplied from the image memory 410 to a single video signal line 3.

FIG. 7 is a timing diagram illustrating the timing of various signals for driving the liquid crystal display device. Specifically, a waveform Vd represents a pixel signal supplied to the single video signal line 3; $Vg_1$, $Vg_2$, $Vg_3$ represent gate signals supplied to three pixels constituting a single color display pixel, respectively; Vr, Vg, Vb represent pixel signals supplied to respective pixels R, G, B, respectively.

The present invention, however, is not limited to the provision of the image memory 410 of the type mentioned above. It goes without saying that in another embodiment, an interface may be provided between the CPU 8 and the controller 9 such that the interface is utilized to change pixel signals from the CPU 8 to a serial form, as described above.

According to the liquid crystal display device of the embodiment described above, each unit pixel region is defined such that the side along the adjacent video signal line 3 is shorter than the side along the scan signal line 2. Stated another way, the liquid crystal display device of the present embodiment employs a lateral stripe structure instead of the conventional vertical stripe structure.

Thus, an area within the laterally extending unit pixel region, into which electric fields from the video signal lines 3 may possibly enter, i.e., areas adjacent to the video signal lines 3 within the unit pixel region, is significantly reduced as compared with the entire pixel region, thereby making it possible to more largely suppress the so-called vertical smear than before.

Also, with the display electrode 15 and the reference electrodes 14 each formed in the shape of a strip extending in the direction orthogonal to the video signal lines 3, electric fields from the video signal lines 3 entering into the pixel region, when the video signal lines 3 terminate to the display electrode 15 or the reference electrodes 14, is in a direction perpendicular to an electric field between the display electrode 15 and the reference electrodes 14, which is involved in actual display, so that the entering electric field will not adversely affect the actual display.

Figure 8A:
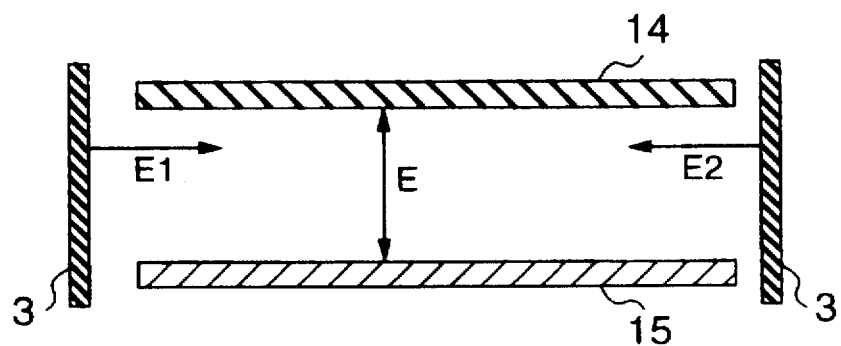
FIGS. 8A and 8B are explanatory diagrams for explaining effects of the liquid crystal display device according to the present invention compared with the prior art.
Figure 8B:
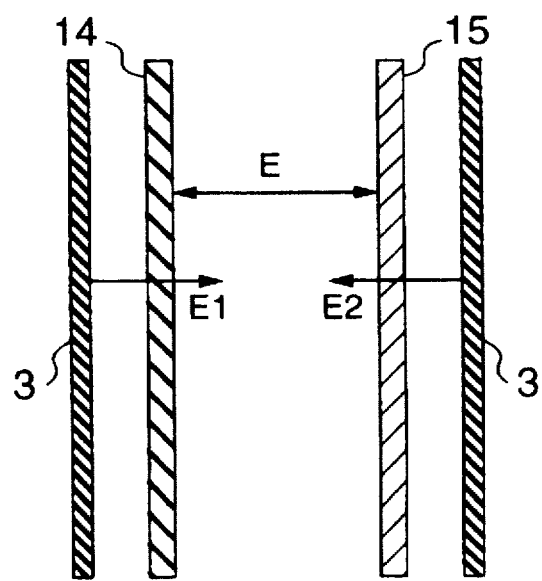

FIGS. 8A, 8B are diagrams for comparing the lateral stripe structure of the present embodiment (FIG. 8A) with the conventional vertical stripe structure (FIG. 8B) in terms of electric fields $E_1$, $E_2$ from the video signal lines 3 entering into the pixel region when the video signal lines 3 terminate to the display electrode 15 or the reference electrodes 14.

In the foregoing embodiment, each of the pixel regions is defined such that the side along the adjacent video signal line is shorter than the side along the scan signal line, and the display electrode and the reference electrodes respectively take the form of a strip extending in the direction orthogonal to the video signal lines.

Alternatively, the display electrode and the reference electrodes may extend in the direction parallel with the video signal lines as long as the pixel region has the side along the adjacent video signal line shorter than the side along the scan signal line.

Further alternatively, the pixel region may have the side along the adjacent video signal line longer than the side along the scan signal line as long as the display electrode and the reference electrode are each formed in the shape of a strip extending in the direction orthogonal to the video signal lines.

In either of the alternative structures mentioned above, vertical smear can be more effectively suppressed than before.

Also, it goes without saying that the present embodiment is not limited to a color display device but is also applicable to a monochrome display device.

Embodiment 2

Figure 10:
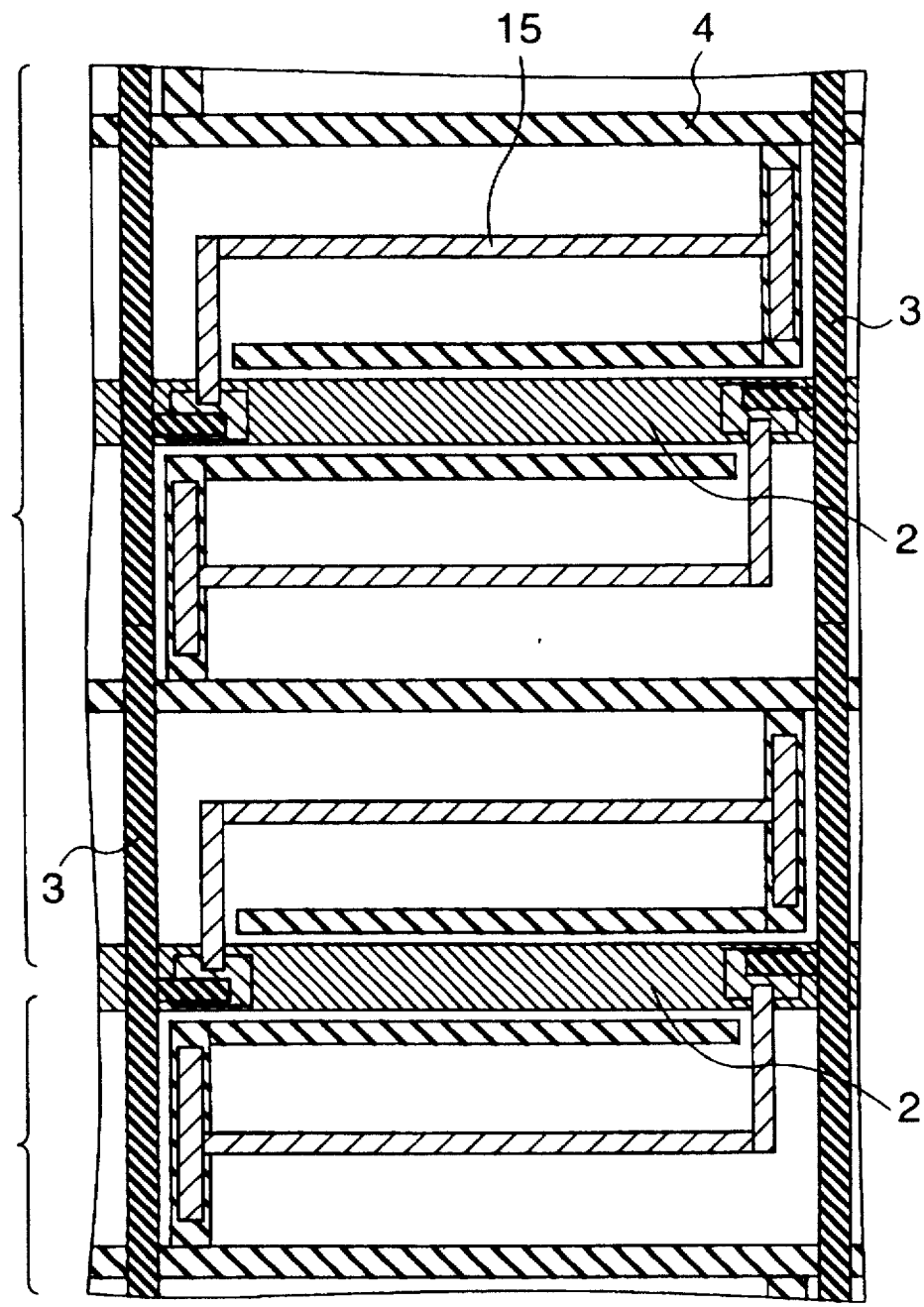
FIG. 10 is a plan view of a pixel region illustrating another embodiment of the liquid crystal display device according to the present invention.

FIG. 10 is a plan view illustrating another embodiment of the active matrix type display device according to the present invention.

Referring specifically to FIG. 10, each of pixel regions arranged along a direction in which video signal lines 3 extend has a similar structure to that of Embodiment 1 in that the pixel regions are assigned to each of color pixels R, G, B, R, . . . , for example, from the uppermost one in the figure. However, Embodiment 2 differs from Embodiment 1 in that adjacent two pixels in a group of three pixels constituting one color display pixel share one scan signal line and that the adjacent two pixels are driven by video signals from different video signal lines 3 to make a display. A common line is positioned in the middle of two gate lines.

Specifically, in an array of the pixels R, G, B, R, G, B, R, G, . . . , a scan signal line 2 is provided for every two pixels combined in order, i.e., (R, G), (B, R), (G, B), (R, G), . . . The scan signal line 2 extends between the associated two pixels. In each pair, the upper pixel is driven for display by a video signal supplied from a video signal line 3 positioned on the left of the pixels in the figure, while the lower pixel is driven for display by a video signal supplied from a video signal line 3 positioned on the right of the pixels in the figure.

Since the display device configured as described above can reduce the number of scan signal lines 2 and correspondingly reduce the numbers of the common lines and the gate lines, the dimension of the pixel region is increased, with the result that an aperture ratio can be improved.

In this case, the pixels may be driven in the following manner. First, within pixel data from the CPU 8 illustrated in FIG. 9, pixel data of two line portions is stored in the image memory 410. Then, a scan signal line 2 is selected for each of the pixel pairs at intervals of ⅔ of a unit selection time generally required for the vertical stripe structure, and pixel data is sequentially applied to the video signal lines 3.

More specifically, assuming that pixels positioned along the direction in which the video signal lines 3 extend are designated by $R_1, G_1, B_1, R_2, G_2, B_2, R_3, \ldots$ in order, a scan signal line $2_1$ between $R_1$ and $G_1$, a scan signal line $2_2$ between $B_1$ and $R_2$, and a scan signal line $2_3$ between $G_2$ and $B_2$ are sequentially applied with scan signals $Vg_1, Vg_2, Vg_3$, respectively. The selection of the scan signal line 2 by applying the scan signal is made at intervals of ⅔ of the unit scan time corresponding to a time required to select one line in the vertical stripe structure.

Figure 11:
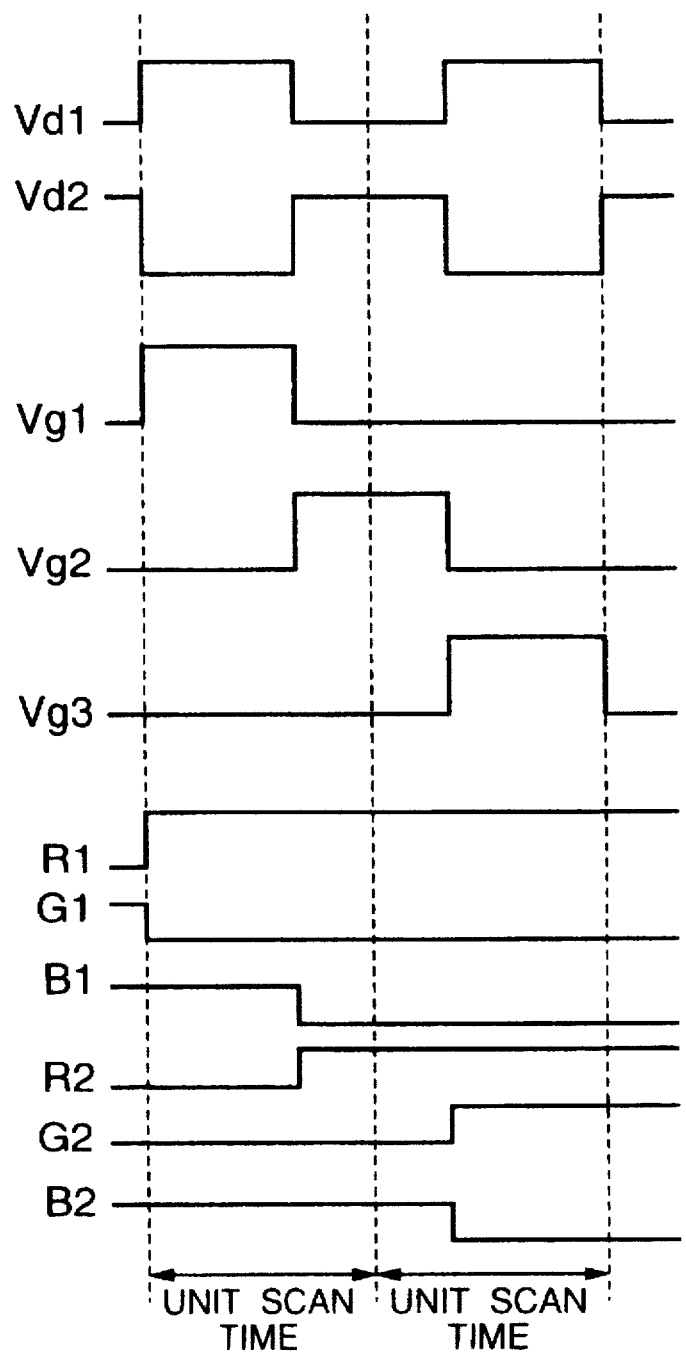
FIG. 11 is a timing diagram illustrating an embodiment of a method of driving the liquid crystal display device shown in FIG. 10.

In this event, video signals $Vd_1, Vd_2$ are supplied from two adjacent video signal lines $3_1, 3_2$. These video signals $Vd_1, Vd_2$ are each synchronized with the scan signals $Vg_1, Vg_2, Vg_3$ and applied at intervals of ⅔ of the unit scan time. As a result, potentials at the respective pixels $R_1, G_1, B_1, R_2, G_2, B_2$ change as illustrated in waveforms of FIG. 11.

It can be understood from the foregoing explanation that during a time period in which two lines are written in the vertical stripe structure, a number of pixels corresponding to the two-line portion can be written even in the lateral stripe structure. For example, two pixels are written with three gate operations, and the frequency of the scan signal for driving the pixels is 1.5 times higher.

Thus, the present embodiment only requires a scan signal at a frequency 1.5 times higher than that used in the vertical stripe structure for writing a corresponding number of pixels in the same time period, thus making it possible to improve the writing characteristic of the thin film transistor TFT.

Embodiment 3

Figure 12:
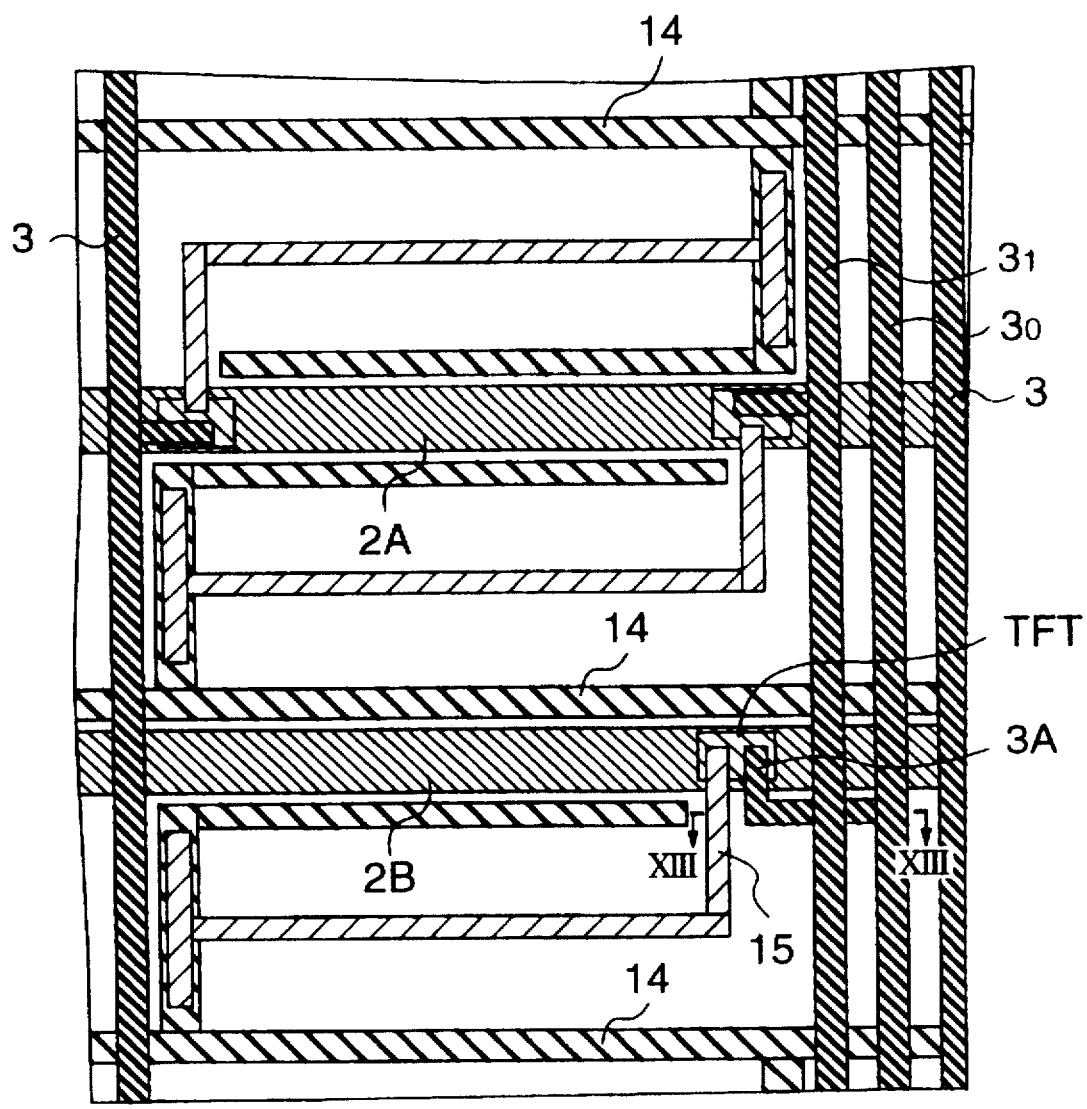
FIG. 12 is a plan view of a pixel region illustrating a further embodiment of the liquid crystal display device according to the present invention.
Figure 13:
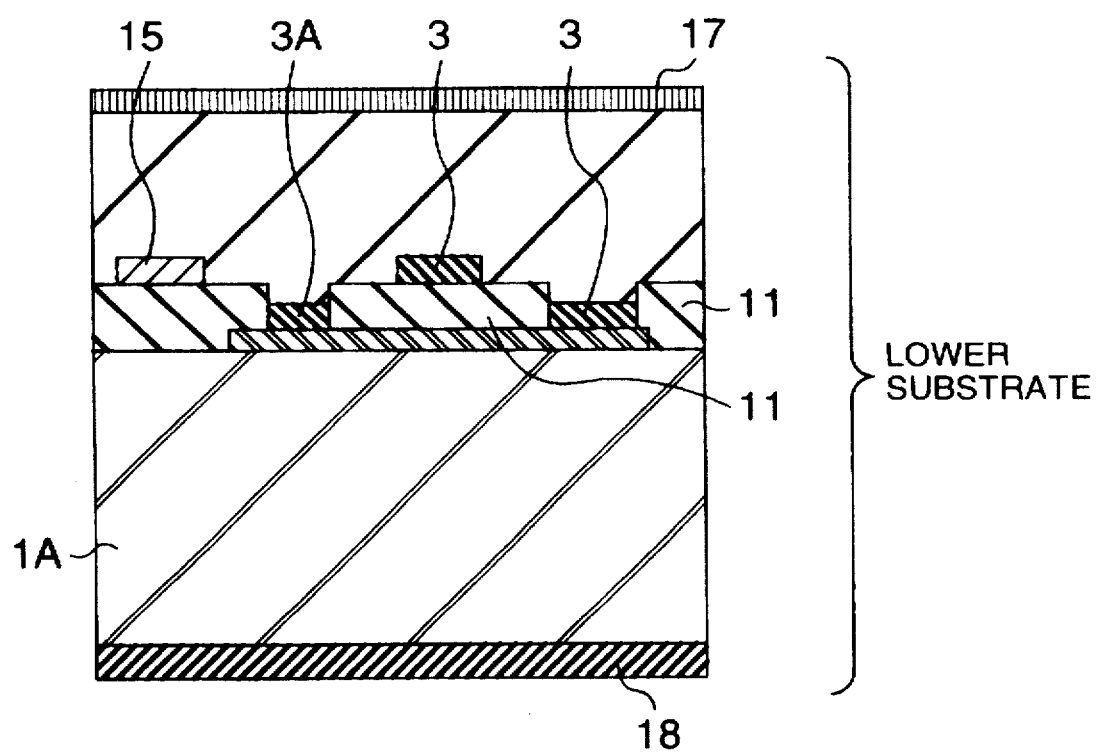
FIG. 13 is a cross-sectional view taken along a line XIII—XIII line in FIG. 12.

FIG. 12 illustrates in a plan view a further embodiment of the active matrix type display device according to the present invention, and FIG. 13 illustrates a cross-sectional view taken along a line XIII—XIII in FIG. 12.

Referring specifically to FIG. 12, each of pixel regions arranged along a direction in which video signal lines 3 extend has a similar structure to that of Embodiment 1 in that the pixel regions are assigned to each of color pixels R, G, B, R, ... for example, from the uppermost one in the figure. However, Embodiment 3 differs from Embodiment 1 in that two adjacent pixels in a group of three pixels constituting a color display pixel share a single scan signal line while the remain one pixel in the same group has a dedicated scan signal line, and the respective pixels in that group are provided with video signals for display from different video signal lines 3, $3_0$, $3_1$, respectively.

Additionally, in the structure of Embodiment 3, a shared scan signal line 2A and a dedicated scan signal line 2B are connected to each other, for example, in a region other than a display region, such that the two scan signal lines 2A, 2B are provided with the same scan signal.

In FIG. 12, the video signal lines 3, $3_0$, $3_1$ are divided into one (3) on the left of the pixel regions and two ($3_0, 3_1$) on the right of the same, wherein the video signal line $3_0$ located outside is connected to a drain electrode 3A of a thin film transistor TFT in an associated pixel through an inter-layer insulating film 11 and the video signal line $3_1$ located inside.

The liquid crystal display device configured as described above is driven for display in a similar driving method to that generally used in a liquid crystal display device of vertical stripe structure type. Therefore, Embodiment 3 is advantageous over the previous embodiments that the image memory 410 or any other interface is not required for displaying images.

What is claimed is:

1. A liquid crystal display device comprising:

a first substrate, a second substrate, a liquid crystal enclosed between said first substrate and said second substrate, a plurality of pixel regions arranged in a matrix form on said first substrate, each said pixel region defining a pixel, and a display electrode, reference electrodes, and a switching element formed in each said pixel region;

a video signal line for supplying a video signal to said display electrode through said switching element;

a scan signal line for supplying a scan signal for controlling said switching element;

reference signal lines for supplying a reference voltage to said reference electrodes;

a first polarizing plate positioned on a surface of said first substrate opposite to a surface adjacent to said liquid crystal; and a second polarizing plate positioned on a surface of said second substrate opposite to a surface adjacent to said liquid crystal, wherein the ratio of an intensity of light after transmitting said first polarizing plate, said first substrate, said liquid crystal, said second substrate, and said second polarizing plate to an intensity of the light before impinging on said first polarizing plate is varied by an electric field generated between said display electrode and said reference electrodes, and said video signal line is formed substantially in parallel with said electric field.

2. A liquid crystal display device according to claim 1, further comprising red, green, and blue color filters, wherein three sub-pixels corresponding to said red, green, and blue color filters constitute one dot, and said sub-pixels are arranged in a direction in which said video signal line extends.

3. A liquid crystal display device according to claim 1, further comprising red, green, and blue color filters, wherein three sub-pixels corresponding to said red, green, and blue color filters constitute one dot, said sub-pixels are arranged in a direction in which said video signal line extends, and said sub-pixels constituting one dot are respectively controlled by different scan signal lines.

4. A liquid crystal display device according to claim 1, further comprising red, green, and blue color filters, wherein three sub-pixels corresponding to said red, green, and blue color filters constitute one dot, said sub-pixels are arranged in a direction in which said video signal line extends, adjacent two sub-pixels in said sub-pixels constituting one dot are controlled by a common scan signal line and are supplied with video signals from different video signal lines.

5. A liquid crystal display device comprising:

a first substrate, a second substrate, a liquid crystal enclosed between said first substrate and said second substrate, a plurality of pixel regions arranged in a matrix form on said first substrate, each said pixel region defining a pixel, and a display electrode, reference electrodes, and a switching element formed in each said pixel region;

a video signal line for supplying a video signal to said display electrode through said switching element;

a scan signal line for supplying a scan signal for controlling said switching element;

reference signal lines for supplying a reference voltage to said reference electrodes;

a first polarizing plate positioned on a surface of said first substrate opposite to a surface adjacent to said liquid crystal; and a second polarizing plate positioned on a surface of said second substrate opposite to a surface adjacent to said liquid crystal, wherein said display electrode and said reference electrode take the form of a strip extending in a direction substantially orthogonal to said video signal line.

6. A liquid crystal display device according to claim 5, further comprising red, green, and blue color filters, wherein three sub-pixels corresponding to said red, green, and blue color filters constitute one dot, and said sub-pixels are arranged in a direction in which said video signal line extends.

7. A liquid crystal display device according to claim 5, further comprising red, green, and blue color filters, wherein three sub-pixels corresponding to said red, green, and blue color filters constitute one dot, said sub-pixels are arranged in a direction in which said video signal line extends, and said sub-pixels constituting one dot are respectively controlled by different scan signal lines.

8. A liquid crystal display device according to claim 5, further comprising red, green, and blue color filters, wherein three sub-pixels corresponding to said red, green, and blue color filters constitute one dot, said sub-pixels are arranged in a direction in which said video signal line extends, adjacent two sub-pixels in said sub-pixels constituting one dot are controlled by a common scan signal line and are supplied with video signals from different video signal lines.

9. An active matrix type liquid crystal display device comprising:

a liquid crystal layer;

transparent substrates arranged opposite to each other through said liquid crystal layer;

a plurality of pixel regions, each corresponding to a unit pixel in said liquid crystal layer, said pixel regions arranged in a matrix, said unit pixels arranged along a first direction of said matrix;

a display electrode and reference electrodes arranged in each of said pixel regions; and a switching element coupled to a scan signal line common to said unit pixels, said switching element being turned on by a scan signal supplied thereto from said scan signal line, wherein said display electrode is supplied with a video signal from a video signal line common to said unit pixels arranged in a second direction orthogonal to said first direction of said matrix through said switching element, a light transmittance of said liquid crystal layer is varied by an electric field generated in parallel with the surfaces of said transparent substrates between said display electrode and said reference electrodes which are applied with a constant voltage through a reference signal line common to said unit pixels arranged in said matrix in said first direction, each said pixel region has a shape such that a side along said video signal line adjacent thereto is shorter than a side along said scan signal line, and said display electrode and said reference electrode each have substantially a strip-like shape extending in a direction orthogonal to said video signal line.

* * * * *